US010343229B2

(12) United States Patent
Hampton et al.

(10) Patent No.: US 10,343,229 B2
(45) Date of Patent: Jul. 9, 2019

(54) RECIPROCATING SAW BLADE WITH CURVED CUTTING EDGE

(71) Applicant: BLACK & DECKER INC., New Britain, CT (US)

(72) Inventors: Stephen A. Hampton, East Longmeadow, MA (US); William B. Korb, Broad Brook, CT (US); Asif Elliston, Springfield, MA (US); Douglas K. Fosberg, Wilbraham, MA (US)

(73) Assignee: BLACK & DECKER INC., New Britain, CT (US)

( * ) Notice: Subject to any disclaimer, the term of this patent is extended or adjusted under 35 U.S.C. 154(b) by 0 days.

(21) Appl. No.: 15/661,703

(22) Filed: Jul. 27, 2017

(65) Prior Publication Data

US 2017/0320152 A1 Nov. 9, 2017

Related U.S. Application Data

(63) Continuation of application No. 14/213,503, filed on Mar. 14, 2014, now Pat. No. 9,757,807.
(Continued)

(51) Int. Cl.
*B27B 13/02* (2006.01)
*B23D 57/00* (2006.01)
(Continued)

(52) U.S. Cl.
CPC ......... *B23D 61/123* (2013.01); *B23D 61/121* (2013.01); *Y10T 83/9319* (2015.04)

(58) Field of Classification Search
CPC .. B23D 61/121; B23D 61/123; Y10T 83/9319
(Continued)

(56) References Cited

U.S. PATENT DOCUMENTS

| 45,009 | A |   | 11/1864 | Alexander |
|--------|---|---|---------|-----------|
| 72,983 | A | * | 1/1868  | Davis ................... B23D 61/121 83/848 |

(Continued)

FOREIGN PATENT DOCUMENTS

| DE | 3706429 A1 |   | 9/1988  |            |
|----|-----------|---|---------|------------|
| FR | 2747951 A1 | * | 10/1997 | ........... B23D 61/128 |

(Continued)

OTHER PUBLICATIONS

Office Action issued in Japanese Application No. 2014-051337, dated Jul. 4, 2018 (6 pages).
(Continued)

*Primary Examiner* — Ghassem Alie
*Assistant Examiner* — Bharat C Patel
(74) *Attorney, Agent, or Firm* — Scott B. Markow

(57) ABSTRACT

A reciprocating saw blade that includes an elongated blade body defining an inner end and a distal end, a cutting edge located on one side of the blade body and extending between the inner and distal ends thereof and a tang located at the inner end of the blade body. The tang projects from the blade body at an acute angle of at least about 3° relative to a line tangent to an inner end of the cutting edge. The cutting edge includes a portion defining a substantially curved contour and optionally can include at least one further portion defining a non-curved contour.

20 Claims, 2 Drawing Sheets

Related U.S. Application Data

(60) Provisional application No. 61/784,277, filed on Mar. 14, 2013.

(51) Int. Cl.
    *B27B 33/02*      (2006.01)
    *B26B 1/00*      (2006.01)
    *B27B 3/12*      (2006.01)
    *B23D 61/12*      (2006.01)

(58) Field of Classification Search
    USPC ........ 83/835–855, 660, 698.61; 30/392–394, 30/329, 355, 350, 369, 514, 517
    See application file for complete search history.

(56) References Cited

U.S. PATENT DOCUMENTS

| | | |
|---|---|---|
| 296,241 A | 4/1884 | Stansbury |
| 336,739 A * | 2/1886 | Parker .................. B23D 61/121 83/848 |
| 1,222,195 A | 4/1917 | Fogle |
| 2,126,382 A | 8/1938 | Goff et al. |
| 2,227,864 A | 1/1941 | Ronan |
| 2,241,703 A | 5/1941 | Gommel |
| 2,242,137 A | 5/1941 | Bernie |
| 2,394,035 A | 2/1946 | Blum |
| 2,568,870 A | 9/1951 | Ronan |
| 2,635,327 A | 4/1953 | Enlow |
| 2,637,355 A | 5/1953 | Chapin |
| 2,735,458 A * | 2/1956 | Buchmann ........... B23D 51/025 83/835 |
| 2,826,941 A | 3/1958 | Kolesh |
| 3,028,889 A | 4/1962 | McCarty |
| 3,033,251 A | 5/1962 | Atkinson et al. |
| 3,111,970 A | 11/1963 | Lou et al. |
| 3,292,674 A | 12/1966 | Arthur |
| 3,314,456 A * | 4/1967 | Craven ................ B23D 61/128 29/90.01 |
| 3,357,462 A | 12/1967 | Craven |
| 3,374,815 A | 3/1968 | Anderson, Jr. et al. |
| 3,630,699 A | 12/1971 | Catlin |
| 3,686,799 A * | 8/1972 | Doty ....................... B23D 49/14 125/18 |
| 3,802,079 A | 4/1974 | Ketchpel et al. |
| 3,805,383 A * | 4/1974 | McNally .............. B23D 49/162 30/378 |
| 4,179,967 A | 12/1979 | Clark |
| 4,232,578 A | 11/1980 | Stellinger et al. |
| D257,943 S | 1/1981 | Finlay |
| RE31,433 E | 11/1983 | Clark |
| 4,557,172 A | 12/1985 | Yoneda |
| 4,600,458 A | 7/1986 | Kramer et al. |
| 4,727,788 A | 3/1988 | Yoshida et al. |
| 4,802,396 A | 2/1989 | Kuklinski |
| D306,817 S | 3/1990 | McMorrough |
| 4,958,546 A | 9/1990 | Yoshida et al. |
| 5,018,421 A | 5/1991 | Lucki et al. |
| 5,094,135 A * | 3/1992 | Nakahara ............. B23D 61/021 83/847 |
| 5,119,708 A | 6/1992 | Musgrove |
| 5,295,426 A | 3/1994 | Planchon |
| 5,331,876 A | 7/1994 | Hayden, Sr. |
| 5,410,935 A | 5/1995 | Holston et al. |
| 5,425,296 A | 6/1995 | Kullmann et al. |
| 5,477,763 A | 12/1995 | Kullman |
| 5,501,129 A | 3/1996 | Armstrong et al. |
| 5,603,252 A | 2/1997 | Hayden, Sr. |
| 5,606,900 A | 3/1997 | Stoddard |
| 5,697,280 A | 12/1997 | Armstrong et al. |
| 5,848,479 A | 12/1998 | MacIndoe |
| 5,868,058 A | 2/1999 | Senegas |
| 6,003,422 A | 12/1999 | Holston |
| D420,262 S | 2/2000 | Khachatoorian |
| 6,125,544 A | 10/2000 | Eriksson et al. |
| 6,145,426 A | 11/2000 | Ward et al. |
| 6,158,324 A | 12/2000 | Kullmann et al. |
| 6,178,646 B1 | 1/2001 | Schnell et al. |
| 6,220,140 B1 | 4/2001 | Hellebergh |
| 6,230,411 B1 | 5/2001 | Wall et al. |
| 6,244,152 B1 | 6/2001 | Nicolantonio |
| 6,276,248 B1 | 8/2001 | Cranna |
| 6,357,124 B1 | 3/2002 | Wall et al. |
| 6,439,094 B1 | 8/2002 | Yoneda et al. |
| D465,138 S | 11/2002 | Raines |
| 6,532,855 B1 | 3/2003 | Ward et al. |
| 6,598,509 B2 | 7/2003 | Cook et al. |
| D482,945 S | 12/2003 | Grolimund |
| 6,782,781 B2 * | 8/2004 | Rack ................... B23D 61/126 30/392 |
| 6,834,573 B1 | 12/2004 | Nakahara |
| 7,036,415 B2 | 5/2006 | Tsujimoto |
| D527,233 S | 8/2006 | Burke, III |
| 7,127,979 B2 | 10/2006 | Kocher et al. |
| 7,131,365 B2 | 11/2006 | Hall et al. |
| D534,401 S | 1/2007 | Duffin et al. |
| 7,174,823 B2 | 2/2007 | Cranna |
| 7,225,714 B2 | 6/2007 | Rompel et al. |
| 7,257,900 B2 * | 8/2007 | Wheeler ................ B23D 51/10 279/77 |
| 7,568,416 B2 | 8/2009 | Tsujimoto |
| 7,600,458 B2 * | 10/2009 | Hampton ............... B23D 51/08 30/337 |
| D606,820 S | 12/2009 | Burke, III |
| D608,611 S | 1/2010 | Lowder |
| D623,490 S | 9/2010 | Lauber |
| 7,806,033 B2 | 10/2010 | Kocher et al. |
| D642,028 S | 7/2011 | Fosberg, Jr. et al. |
| 8,210,081 B2 * | 7/2012 | Elliston ............... B23D 61/121 83/835 |
| 8,261,456 B2 | 9/2012 | Scott et al. |
| D686,049 S | 7/2013 | Ji |
| D686,470 S | 7/2013 | Ji |
| D693,661 S | 11/2013 | Fosberg, Jr. et al. |
| 8,596,166 B2 | 12/2013 | Bucks et al. |
| 8,607,464 B2 | 12/2013 | Scott et al. |
| D725,450 S | 3/2015 | Hampton et al. |
| 2001/0004860 A1 | 6/2001 | Kullmann et al. |
| 2001/0006017 A1 * | 7/2001 | Osada .................... B23D 61/12 83/697 |
| 2001/0015120 A1 | 8/2001 | Hickey |
| 2002/0050196 A1 | 5/2002 | Fluhrer et al. |
| 2002/0121023 A1 | 9/2002 | Kocher et al. |
| 2002/0184988 A1 | 12/2002 | Rohman et al. |
| 2003/0010179 A1 | 1/2003 | McLuen |
| 2003/0024354 A1 | 2/2003 | Ward et al. |
| 2003/0051593 A1 | 3/2003 | Kocher et al. |
| 2004/0035282 A1 | 2/2004 | Tsujimoto |
| 2004/0050234 A1 | 3/2004 | Fluhrer et al. |
| 2004/0182218 A1 | 9/2004 | Chao |
| 2004/0255749 A1 | 12/2004 | Hayden |
| 2005/0172416 A1 | 8/2005 | Feliciano |
| 2005/0211046 A1 | 9/2005 | Thomas et al. |
| 2005/0229407 A1 | 10/2005 | Kanzawa |
| 2005/0235799 A1 | 10/2005 | Hampton et al. |
| 2005/0257660 A1 | 11/2005 | Hayden |
| 2005/0262702 A1 | 12/2005 | Hawthorn |
| 2006/0065098 A1 | 3/2006 | Cranna |
| 2006/0130628 A1 | 6/2006 | Rompel et al. |
| 2006/0130629 A1 | 6/2006 | Rompel et al. |
| 2006/0162526 A1 | 7/2006 | Nagano et al. |
| 2006/0174495 A1 | 8/2006 | Jumior |
| 2007/0193427 A1 | 8/2007 | Hayden |
| 2007/0199416 A1 | 8/2007 | Cook et al. |
| 2007/0214922 A1 | 9/2007 | Cook et al. |
| 2007/0251372 A1 | 11/2007 | Petts et al. |
| 2008/0121079 A1 | 5/2008 | Hashimoto et al. |
| 2008/0201964 A1 * | 8/2008 | Camargo ............ B23D 61/121 30/353 |
| 2008/0307936 A1 | 12/2008 | Elliston et al. |
| 2009/0144992 A1 | 6/2009 | Bucks |
| 2009/0145280 A1 | 6/2009 | Bucks et al. |
| 2009/0293698 A1 | 12/2009 | Tran et al. |

(56) References Cited

U.S. PATENT DOCUMENTS

| | | | |
|---|---|---|---|
| 2010/0126328 A1* | 5/2010 | Grolimund | .......... B23D 61/128 83/848 |
| 2010/0175532 A1 | 7/2010 | Evatt et al. | |
| 2010/0218389 A1 | 9/2010 | Kalomeris et al. | |
| 2010/0319201 A1 | 12/2010 | Scott et al. | |
| 2011/0259168 A1 | 10/2011 | Butzen et al. | |
| 2011/0271815 A1 | 11/2011 | Elliston et al. | |
| 2012/0000338 A1 | 1/2012 | Elliston et al. | |
| 2012/0090443 A1 | 4/2012 | Butzen et al. | |
| 2012/0216656 A1 | 8/2012 | Bucks et al. | |
| 2012/0297952 A1 | 11/2012 | Butzen et al. | |
| 2012/0324744 A1 | 12/2012 | Henrickson | |
| 2013/0031791 A1 | 2/2013 | Butzen et al. | |
| 2013/0174701 A1* | 7/2013 | Elliston | ................ B23D 61/126 83/34 |
| 2013/0227844 A1 | 9/2013 | Kazda et al. | |
| 2013/0228059 A1 | 9/2013 | Kazda et al. | |
| 2014/0033889 A1 | 2/2014 | Bucks et al. | |
| 2014/0082948 A1* | 3/2014 | Staub | ...................... B24B 23/04 30/355 |
| 2014/0260879 A1* | 9/2014 | Grolimund | .......... B23D 61/121 83/835 |

FOREIGN PATENT DOCUMENTS

| | | |
|---|---|---|
| GB | 641636 A | 8/1950 |
| GB | 715294 A | 9/1954 |
| JP | 480379 B | 7/1978 |
| JP | 2001-179536 A | 7/2001 |
| JP | 2010082713 A | 4/2010 |
| JP | 2010528892 A | 8/2010 |
| JP | 2011-131317 A | 7/2011 |
| JP | 2012-143818 A | 8/2012 |
| WO | 2012/166096 A1 | 12/2012 |
| WO | WO 2012166096 A1 * | 12/2012 ........... B23D 61/126 |

OTHER PUBLICATIONS

Office Action issued in Japanese Application No. 2014-051337, dated Jan. 23, 2018 (10 pages).
Office Action issued in Canadian Application No. 2,845,968, dated May 14, 2015 (4 pages).
Lenox Tools. Lenox Product Catalog (8 pages).
Pruning Saw by T-Rex Extreme. http://www.pruningsaw.info/ (1 page).
Heady Manufacturing Company, T-Rex Extreme, http://www.t-rexextreme.com (1 page).
Global Saw, Saber Saw BARIGIRE. Captured web page, p. 1. www.motoyuki.co.jp.
Sen Hwa Enterprise Co., Ltd. 2007 Trade Pages, Tools. p. 85.
Grainger Wholesale Net Price Catalog No. 373, Spring 1988, captured web page, p. 593.
W.W. Grainger, Inc. DEWALT Recip Saw Blade. Captured web page (1 page).
Kabushiki Kaisha Homemaking. Hitachi Koki. Captured we pageb, p. 141.
Milwaukee Electric Tool Corporation. Milwaukee Hackzall Blade. Amazon.com captured web page (1 page).
Milwaukee Electric Tool Corporation. Diamond Grit Torch Sawzall Blade. Captured web page (1 page).
Lenox Tools UK. Lenox Gold Metal Reciprocating Saw Blades. Facebook.com captured web page (1 page).
Search results from the Australian Patent Office (1 page).
European Search Report and Written Opinion from corresponding European Patent Application No. 14000947.3, dated Jul. 1, 2014 (9 pages).
Internet Archive Wayback Machine, captured web page (1 page).

* cited by examiner

RECIPROCATING SAW BLADE WITH CURVED CUTTING EDGE

CROSS-REFERENCE TO RELATED APPLICATIONS

This application claims the benefit under 35 U.S.C. § 120 to U.S. patent application Ser. No. 14/213,503, titled "Reciprocating Saw Blade with Curved Cutting Edge," filed Mar. 14, 2014, which claimed priority under 35 U.S.C. § 119 to U.S. Provisional Patent Application No. 61/784,277, filed Mar. 14, 2013, and titled "Reciprocating Saw Blade with Curved Cutting Edge," the entire contents of each of which is hereby expressly incorporated herein by reference for all purposes.

FIELD OF THE INVENTION

The present invention relates to reciprocating saw blades, and more particularly, to reciprocating saw blades having an at least partially curved cutting edge.

BACKGROUND OF THE INVENTION

A reciprocating saw machine is a power saw, often hand held, including a chuck that releasably engages one end of a reciprocating saw blade (i.e., a tang on the inner end of the saw blade) and drives the inner end, and thus the saw blade, in a back and forth reciprocating motion through a work piece. Reciprocating saw machines are typically driven by electric motors (e.g., cord or cordless saws), or are pneumatically driven. The reciprocating motion can be an orbital cutting action, a straight or linear cutting action, or an angled cutting action. Reciprocating saws are sometimes referred to as recip saws, or jig saws, and reciprocating saw blades are sometimes referred to as recip blades or jig saw blades. A jig saw includes a handle and a relatively small, thin blade oriented to be used comfortably on horizontal surfaces. A recip saw usually has a larger blade and blade-mounting assembly resembling that of a jig saw, but includes a handle oriented to allow the saw to be used comfortably on vertical surfaces. Well known reciprocating saws are sold under the brand names "SAWZALL™" by Milwaukee Electric Tool Corporation and "TIGER SAW™" by Porter-Cable Corporation.

Some reciprocating saw machines also include a shoe attached to the front end thereof, having a central opening through which the saw blade extends. The shoe is adapted to engage a work piece during cutting to stabilize and guide the reciprocating movement of the saw blade into an out of the work piece.

A reciprocating saw blade for use in a reciprocating saw is typically elongated having a length selected for a particular cutting application. As mentioned, the inner end of the blade defines a tang for releasably mounting the blade in the chuck of a reciprocating saw, and the outer end of the blade is a free end that engages a work piece. Some recip blades, however, have tangs on both ends, such as described in U.S. patent application Ser. No. 12/396,318, filed Mar. 2, 2009, entitled "Reciprocating Saw Blade with Tangs on each End and Related Method," which is hereby expressly incorporated by reference in its entirety as part of the present disclosure. Typical reciprocating saw blades include a cutting edge, extending between the inner and outer ends of the blade, defined by a plurality of cutting teeth spaced relative to each other along one side of the blade or some other cutting medium. Often, a non-working edge is formed on an opposite side of the blade relative to the cutting edge. Some blades, however, have two opposing cutting edges, such as described in U.S. patent application Ser. No. 13/344,647, filed Jan. 6, 2012, entitled "Double-Sided Reciprocating Saw Blade and Related Method," which is hereby expressly incorporated by reference in its entirety as part of the present disclosure.

A reciprocating saw blade relies, in part, on its tang angle for its effective cutting action. The tang angle is the angle between the tang and the cutting edge. A positive tang angle increases the cutting angle of the blade. An increased cutting angle generally provides more aggressive cutting action and thus quicker cutting. However, increased cutting angle requires more power to start or continue the cut, and can affect wear and/or durability of the blade. Large cutting angles can also result in high and even excessive vibration transmitted to the user, resulting in a poor end user experience that is described as a "rough feel" when using the blade. Therefore, where the design of the cutting portion of the blade and/or the material to be cut can implicate these effects, tang angle is selected so that the cutting angle of the blade does not exceed an acceptable amount.

Another factor limiting the magnitude of a blade tang angle is the shoe of the saw machine. The tang angle of the blade must be small enough so that the blade will not interfere with, or cut into, the shoe while reciprocating through the central opening thereof, thereby damaging the shoe and also unnecessarily increasing blade wear.

Yet another factor that limits the magnitude of the tang angle is that as the tang angle increases the proximal end of the tang comes closer to the tooth edge. As many recip saw blades are punched from continuous toothed strip the proximal end of the tang may intersect the gullets of the teeth in the strip. This is undesirable because it reduces the life of the punching dies and also creates a discontinuous, notched surface along the tang that the end user will regard as a product defect. Thus, it may not be practical or possible to provide a tang angle to achieve a desired effective cutting angle.

SUMMARY OF THE INVENTION

It is an object of the present invention to overcome one or more of the above-described drawbacks and/or disadvantages of the prior art.

In accordance with one aspect, the present invention is directed to a reciprocating saw blade, comprising an elongated blade body defining an inner end and a distal end, a cutting edge located on one side of the blade body, extending between the inner and distal ends thereof, an opposing edge located on an opposing or opposite side of the blade body relative to the cutting edge and a tang located at the inner end of the blade body and projecting therefrom at an acute angle of at least about 3° relative to a line tangent to an inner end of the cutting edge, wherein at least a portion of the cutting edge defines a curved contour curved toward or in the direction of the opposite edge. In some embodiments, the entirety of the cutting edge is curved.

In some embodiments, the cutting edge includes a first portion defining a substantially non-curved contour and a second portion defined by the curved contour. In some such embodiments, the first portion defines an innermost portion of the cutting edge. In certain embodiments, the first portion defines a length of about 1.5 inch. In another embodiment, the second portion is located distally adjacent to the first portion. In some embodiments, the second portion defines a length within the range of about 1.5 inch to about 3 inch. In various embodiments, the second portion curves in a concave direction toward or in the direction of the opposing edge of the blade body.

In yet further embodiments, the cutting edge further includes a third portion defining a substantially non-curved contour. The third portion can be defined by a distal-most portion of the cutting edge. In some embodiments, the third portion defines a length within the range of about 1.5 inch to about 3 inches.

In various embodiments, the curved portion curves a maximum distance toward or in the direction of the opposing edge within the range of about 0.030 inch to about 0.200 inch. In some such embodiments, the curved portion curves a maximum distance toward or in the direction of the opposing edge within the range of about 0.030 inch to about 0.120 inch. The maximum distance corresponds in some embodiments to an approximately middle point of the curved portion.

In certain embodiments, the acute angle is within the range of about 3° to about 8°. In some such embodiments, the acute angle is within the range of about 3° to about 6°. Where the tang angle is at least about 3°, the saw blades provide increased cutting performance over saw blades defining a smaller or zero tang angle.

An advantage of the present invention is that the curvature of the cutting edge further increases the cutting angle with which the cutting edge engages a work piece. Thus, the "effective" cutting angle at a point along the cutting edge is created by the combination of the actual tang angle and the angle/degree of curvature of the blade at that point. As the curvature of the cutting edge increases the cutting angle beyond the actual tang angle, it improves cutting performance even further over conventional saw blades having substantially straight cutting edges. The invention provides this cumulatively larger effective cutting angle while maintaining a sufficiently small actual tang angle for the blade to clear the shoe of the saw machine. Therefore, interference or cutting of the shoe by the saw blade while reciprocating through the central opening thereof is mitigated by the curvature of the cutting edge, thus reducing unnecessary wear of the blade and mitigating damage to the shoe as well.

A further advantage is provided where the cutting angle changes progressively, e.g., increases, along the curved portion of the blade. Thus, during the stroke of the saw, the cutting angle changes gradually, providing smoother, progressive cutting and minimizing shock or impact to consecutive teeth. It also permits a cut to be started at the proximal end of the cutting edge, where the cutting angle is the smallest (e.g., equaling the actual tang angle), so that the cutting action at cut initiation (power, vibration, wear, durability, etc.) is similar to a convention straight blade.

Other objects and advantages of the present invention will become more readily apparent in view of the following detailed description and the accompanying drawings.

DESCRIPTION OF EMBODIMENTS OF THE INVENTION

Figure 1:
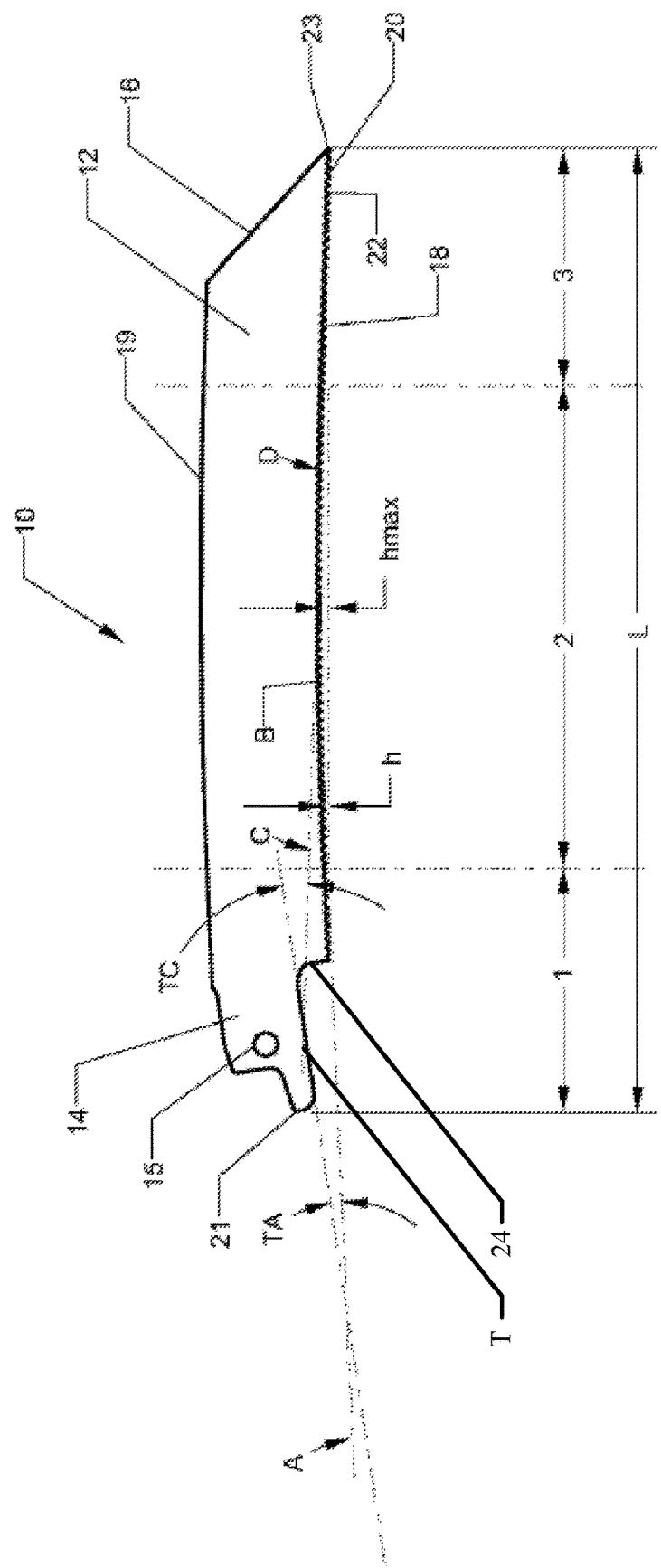
FIG. 1 is a schematic side view of an embodiment of a reciprocating saw blade having a curved cutting edge.

In FIG. 1, a reciprocating saw blade is indicated generally by the reference numeral 10. The reciprocating saw blade 10 includes an elongated blade body 12, defining a tang 14 at an inner end thereof for releasable engagement with a chuck of a reciprocating saw, and a free end 16 at an opposing distal end thereof for engagement with a work piece.

The tang 14 is sized and shaped to allow the blade 10 to be engaged by a clamping device. As should be understood by those of ordinary skill in the pertinent art, the shape and dimensions of the tang may be configured to be compatible with widely used reciprocating saws and chucks, such as, for example, a one-half inch universal tang, or may be configured to be compatible with a unique or specific chuck of a reciprocating saw, such as, for example, a quick change chuck. As shown in FIG. 1, the tang 14 defines a tang aperture 15 extending through the tang 14. One purpose of the tang aperture 15 is to increase the strength and otherwise enhance the safety associated with clamping or connecting the blade 10 to a particular clamping device, e.g., a chuck, by use of a connecting element, e.g., a stud or pin, extending through the tang aperture 15 whenever the configuration or construction of the clamping device permits. Thus, the tang aperture 15 may also be sized, shaped, positioned and/or configured to operatively accommodate any of a variety of different chucks or like connecting elements.

During operation, when the saw blade is engaged by the chuck or like mechanism of the saw, e.g. via the tang, the reciprocating saw drives the saw blade 10 in a reciprocating motion as described above, e.g., a series of push and pull or forward and return strokes. During each stroke, the saw blade 10 moves between a rearmost position and a forward most position to, in turn, apply a cutting action to a work piece. That is, the cutting features of the blade, e.g., the free end 16, move into engagement with, and through, a work piece.

In order to effectively operate in a reciprocating saw, the blade body 12 of the reciprocating saw blade 10 must be sufficiently rigid to allow the blade 10 to be engaged by the chuck of a reciprocating saw at only one end of the blade, while the opposite free end of the blade is driven in a reciprocating motion into engagement with and through a work piece. In the illustrated embodiment, the blade body 12 is formed of metal, such as, for example, carbon steel or spring steel. However, as should be understood by those of ordinary skill in the art, the blade may be formed of other materials, currently known or that later become know, depending upon the intended cutting application.

The blade body 12 also defines a cutting edge 18 along one elongated side thereof, extending between the tang 14 and the distal end 16. In the illustrated embodiment, the blade body 12 also defines a non-working edge 19 along the opposing elongated side of the blade body, extending between the tang 14 and the distal end 16. However, as should be understood by those of ordinary skill in the art, the blade body may alternatively define an opposing second cutting edge.

The cutting edge 18 is defined by a plurality of cutting elements or teeth 20, each defining a tooth tip 22. As should be understood by those of ordinary skill in the pertinent art, the cutting teeth 20 are adapted for respective cutting application(s) based on, for example, the particular tooth geometries or forms (such as by configuring clearance surfaces and clearance angles), the pitch or number of teeth-per-inch ("tpi"), sets, and/or the teeth heights or height differentials. Exemplary cutting teeth configurations are disclosed in U.S. patent application Ser. No. 12/396,318, filed Mar. 2, 2009, entitled "Reciprocating Saw Blade with Tangs on each End and Related Method"; U.S. Pat. No. 8,210,081, issued Jul. 3, 2012, entitled "Reciprocating Saw Blade Having Variable-Height Teeth and Related Method," which, in turn, claims the benefit of similarly titled U.S. Provisional Patent Application No. 60/934,262, filed Jun. 12, 2007; U.S. patent application Ser. No. 13/344,647, filed Jan. 6, 2012, entitled "Double-Sided Reciprocating Saw Blade and Related Method;" U.S. patent application Ser. No. 12/776,145, filed May 7, 2010, entitled "Recip Blade with Robust Tooth Form"; and U.S. patent application Ser. No. 12/827,658, filed Jun. 30, 2010, entitled "Saw Blade Tooth Form for Abusive Cutting Applications," each of which is hereby expressly incorporated by reference in its entirety as part of the present disclosure.

As shown in FIG. 1, the saw blade 10 defines a length L, extending from a tip 21 of the tang 14 at the inner end of the blade body 12 to a distal tip 23 of the distal end 16 of the blade body 12. In some embodiments, the saw blade 10 defines a length L within the range of about 4 inches to about 12 inches. In the illustrated embodiment, the saw blade 10 defines a length L of about 6 inches. However, as should be understood by those of ordinary skill in the pertinent art, the length of the saw blade 10 may be changed as desired or otherwise required for an intended cutting application.

Straight reference line "A" indicates an imaginary line tangent to the cutting edge 18 at its inner end 24. The tang 14 is oriented at an actual tang angle TA, defined between an elongated bottom edge T of the tang 14 relative to the reference line A, as shown in FIG. 1. The tang angle TA orients the cutting edge 18 such that the cutting edge is angled downwardly at an acute angle relative to the elongated bottom edge T of the tang, and thus relative to the reciprocating motion of the saw (regardless of whether the saw reciprocates along or parallel to elongated bottom edge T of the tang). Therefore, the tang angle TA increases the cutting angle of the cutting edge 18, i.e., the angle with which the cutting edge 18 engages the work piece, and enables the cutting edge 18 to more effectively cut work pieces in respective cutting application(s). As a result, the tang angle facilitates maintaining the rake faces or cutting edges of the teeth 20 more fully engaged with the work piece during and throughout the cutting stroke. It imparts a more positive effective rake angle on the teeth. Even if the teeth define a 0° or substantially 0° rake angle or a negative rake angle that is less than the tang angle, the blade will cut with an effective rake angle that is positive. This increases the cutting action of the teeth and blade. As may be recognized by those skilled in the pertinent art based on the teachings herein, the tang or cutting angle can be tuned to the respective cutting edge and/or cutting application to optimize the cutting performance of that cutting edge for the respective cutting application or applications of that cutting edge. In the illustrated embodiment, the tang 14 defines a tang angle TA within the range of about 3° to about 8°. In some embodiments, the tang 14 defines a tang angle TA within the range of about 3° to about 6°.

As shown in FIG. 1, the tips 22 of the teeth 20 define a contour of the cutting edge 18 that is shown in FIG. 1 by imaginary line "B." The contour of the cutting edge, i.e., as shown by line B, is curved concavely toward or in the direction of the edge 19. In some embodiments, the cutting edge 18 defines at least one substantially straight, non-curved portion and at least one curved portion. In the illustrated embodiment, the cutting edge contour B defines 3 adjacent sections or portions. The first section 1, defining an innermost section of the cutting edge 18 as shown in FIG. 1, is a non-curved section. In some embodiments, the length from the tip 21 of the tang 14 to the distal end of the first section 1 is about 1.5 inch. Thus, in embodiments utilizing a one-half inch universal tang, for example, the first section 1 defines a length of approximately 1 inch.

The second, middle section 2, distally adjacent the first section 1, defines a curved portion of the cutting edge 18. The second section 2 is curved toward or in the direction of the non-working edge 19, i.e., in a concave manner relative to the reference line A. In some embodiments, the second section 2 defines a length within the range of about 1.5 inch to about 3 inches. In the illustrated embodiment, the second section 2 is curved such that at a point thereof, e.g., an approximately middle point thereof, it is curved a max distance $h_{max}$ toward or in the direction of the rear edge 19. That is, at that point, reference line B is located a distance h from the reference line A. In the illustrated embodiment, where length L is about 6 inches, the maximum distance $h_{max}$ is within the range of about 0.030 inch to about 0.200 inch, and in some embodiments, the maximum distance $h_{max}$ is within the range of about 0.030 inch to about 0.120 inch. For longer or shorter blades, the maximum distance $h_{max}$ would be proportionally greater or less, respectively, according to the arc length of the blade. It should be understood by those of ordinary skill in the art, though, that said proportionality is not necessarily linearly proportional based on blade length, because, as indicated above, the relevant parameter is arc length, not linear length. The amount of curvature, e.g., $h_{max}$, may be selected according to the particular blade design and cutting application, to achieve desired performance, wear, durability and cutting "feel" of the blade. For example, the inventors have found that wood cutting applications tolerate a curvature/$h_{max}$ toward the higher end of the above-discussed ranges.

In the illustrated embodiment, the curvature of the curved section is substantially constant, i.e., defines a substantially constant radius of curvature, such that the distance h by which the cutting edge 18 has curved substantially equally and progressively decreases in both directions from the maximum point of $h_{max}$ toward the opposing ends of the second section 2. In other embodiments, the curvature is not substantially constant, but varies along the length of the second section 2. For example, the radius of curvature would increase or decrease, linearly, progressively, or otherwise vary, along the length of the second section 2.

The third section 3, adjacent the second section 2, extends from the distal end of the second section 2 to the distal end 16 of the blade 10. In some embodiments, the third section defines a length within the range of about 1.5 inch to about 3 inch. In the illustrated embodiment, the third section 3 is substantially not-curved. However, as should be recognized by those of ordinary skill in the pertinent art based on the teachings herein, the dimensions of the first, second and third sections defining the cutting edge contour B are exemplary, and may be changed as desired or otherwise required. For example, for blades that are longer than 6 inches, the curved portion of the cutting edge, and/or the substantially not-curved portion(s), may define a greater length. Alternatively, the either the first and second or second and third sections of the cutting edge may combine as one curved section. In yet other embodiments, the entire cutting edge 18 of the blade is curved. In some embodiments the rear edge 19 is curved, e.g., in like manner as the cutting edge 18.

Figure 2:
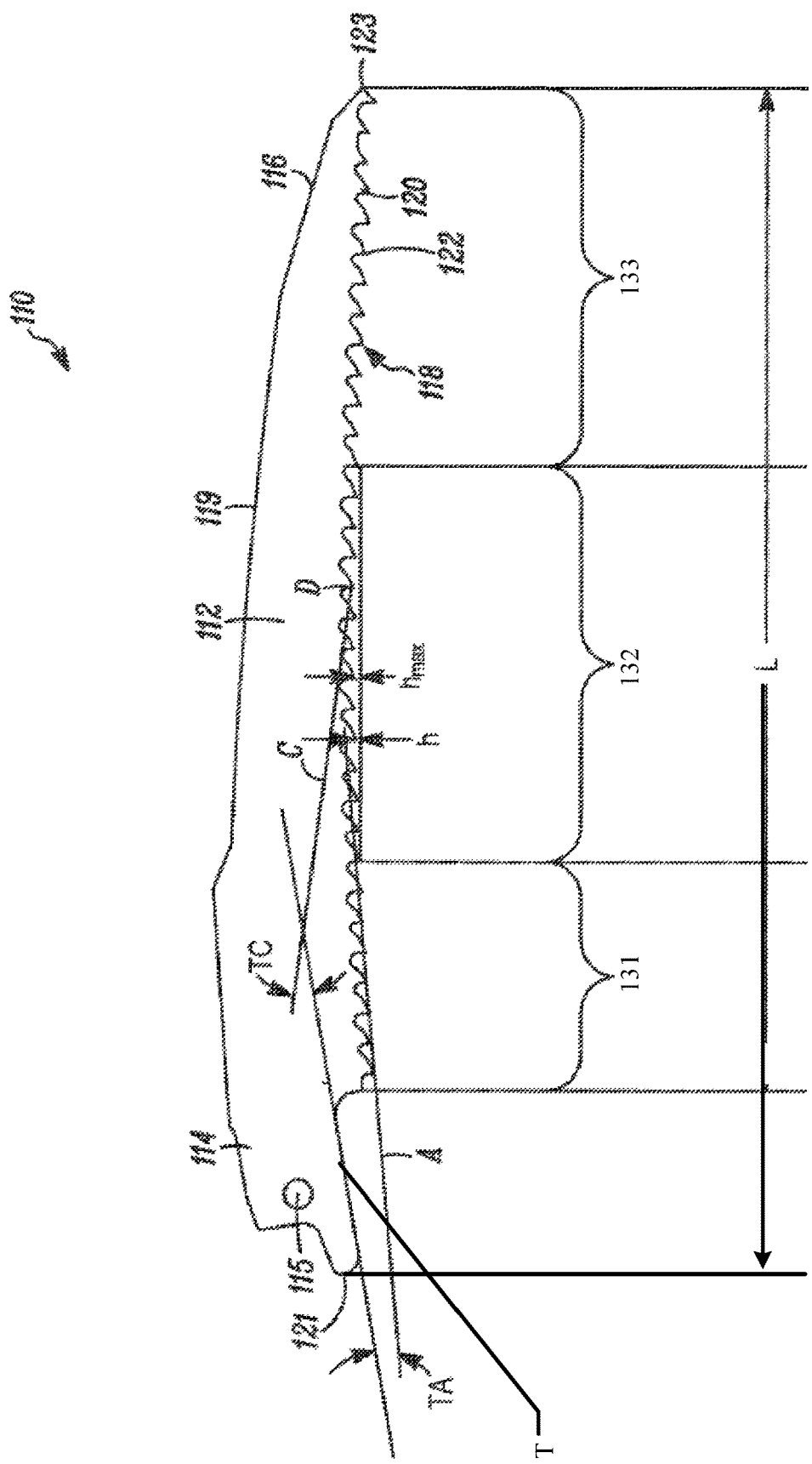
FIG. 2 is a schematic side view of another embodiment of a reciprocating saw blade having a curved cutting edge.

In FIG. 2, another saw blade is indicated generally by the reference numeral 110. The blade 110 is substantially similar to the saw blade 10 described above in connection with FIG. 1, and therefore like reference numerals preceded by the numeral "1" are used to indicate like elements. A primary difference of the blade 110 in comparison to the blade 10 is that the blade 110 is designed for cutting a different material than the blade 10. In the embodiment shown in FIG. 2, the blade 110 is designed for cutting wood. Accordingly, the blade 110 has a different toothform and different dimensions than the blade 10. However, this embodiment is not limited to a particular material and can be used to cut a variety of materials that are known or may become known. It should also be understood that while the embodiment shown in FIG. 2 includes straight section 131 toward the inner end and straight section 133 toward the distal tip 123, other embodiments do not have one or both of the straight section 131 and straight section 133, where the curved section 132 extends to one or both of the inner end and the distal tip 123. That is, in some embodiments, the entire cutting edge 118 of the blade 110 is curved.

One advantage associated with the above-mentioned blade configurations 1s that because the tang defines a tang angle TA greater than about 3°, the saw blades 10, 110 provide increased cutting performance over saw blades defining a smaller or zero tang angle. Another advantage associated with the above-mentioned blade configurations is that the curvature of cutting edge 18 further increases the cutting angle with which the cutting edge 18 engages a work piece. Thus, the "effective" cutting angle at a point along the cutting edge is created by the combination of the actual tang angle TA and the angle/degree of curvature of the blade at that point. For example, as shown in FIG. 1, straight reference line "C" indicates an imaginary line tangent to a point D along the curved section of the cutting edge 18. The effective cutting angle TC at point D, defined between the elongated edge T of the tang 14 relative to the reference line C, is the sum of the actual tang angle TA and the angle of curvature of the blade at the point D, e.g., relative to line A. As the curvature of the cutting edge 18 increases the cutting angle beyond the actual tang angle TA, it improves cutting performance even further over conventional saw blades having substantially straight cutting edges. The invention provides this cumulatively larger effective cutting angle while maintaining a sufficiently small actual tang angle TA for the blade to clear the shoe of the saw machine. Therefore, interference or cutting of the shoe by the saw blade 10 while reciprocating through the central opening thereof is mitigated by the curvature of the cutting edge, thus reducing unnecessary wear of the blade 10 and mitigating damage to the shoe as well.

Another advantage is that cutting angle changes progressively, e.g., increases, along the curved portion of the blade. Thus, during the stroke of the saw, the cutting angle changes gradually, providing smoother, progressive cutting and minimizing shock or impact to consecutive teeth. It also permits a cut to be started at the proximal end of the cutting edge, where the cutting angle is the smallest (e.g., equaling the actual tang angle), so that the cutting action at cut initiation (power, vibration, wear, durability, etc.) is similar to a convention straight blade.

Accordingly, the invention achieves unexpected results previously not thought possible in the industry and by those of ordinary skill in the art. It was previously thought by those of ordinary skill in the pertinent art that the larger effective cutting angle provided by the combination of a higher tang angle and a curved blade, as described herein, would too aggressively affect blade wear and/or durability of the saw blade. Similarly, it was thought that such a combination would require excessive power by a user to start or continue a cut. Accordingly, it was believed and taught that where a non-straight blade was used, the tang angle should be reduced to a small angle, significantly smaller than the tang angle used in an equivalent straight blade (e.g., a straight blade having, for example, a similar tooth profile). However, contrary to previous teachings and conventional wisdom, the inventors have unexpectedly found that the combination of a larger tang angle TA and the concave curvature of the blade as described herein provides increased cutting performance without excessive detriment to blade wear, blade durability, or ease of starting and/or continuing a cut.

It should be understood that the term "about" and like terms used herein when referring to a dimension or characteristic of blades of the invention indicate that the described dimension/characteristic is not a strict boundary or parameter and does not exclude variations therefrom that are functionally similar. At a minimum, such references that include a numerical parameter would include variations that, using mathematical and industrial principles accepted in the art (e.g., rounding, measurement or other systematic errors, manufacturing tolerances, etc.), would not vary the least significant digit.

As may be recognized by those of ordinary skill in the pertinent art based on the teachings herein, numerous changes and modifications can be made to the above-described and other embodiments of the present invention without departing from the scope of the invention as defined in the appended claims. For example, the cutting edge can have one or more bends along the cutting edge to effect a change in cutting angle, rather than defining a curved portion of the cutting edge. This could be accomplished, by way of example only, by actually bending the blade in the desired direction, e.g., in the plane of the blade, or by punching or machining the cutting edge of the blade to have such bend(s). Accordingly, the portion of the cutting edge distal of the bend will engage a work piece at a cutting angle greater than the portion of the cutting edge proximal of the bend. The cutting angle of the bent portion is defined as the sum of the tang angle and the total bend angle of the bent portion, e.g., the cumulative bend relative to the proximal end of the cutting edge. Though in such embodiments the change of cutting angle will be discrete and not continuous as with a curved cutting edge, the number of bends and the amount (degree) of each bend can be selected so as to not overly detrimentally affect saw operation, as should be understood by those of ordinary skill in the art. By altering, e.g., increasing, the cutting angle in such a step-wise fashion, the benefits of the invention can be achieved.

As another example, the saw blades may include two tangs and two cutting edges on opposing sides of the blade body. One tang would be used to drive a first cutting edge of the blade and define an effective tang angle for the first cutting edge. The other tang would be used to drive the second cutting edge of the blade and define an effective tang angle for the second cutting edge. One cutting edge may be substantially straight, and the other cutting edge may be substantially curved. Alternatively both cutting edges may be substantially curved. As another example, in some embodiments, the cutting edge may be defined by cutting teeth, such as carbide tipped, bi-metal, or traditional carbon steel teeth. In addition, the saw blades of the present invention may be coated with any of numerous different coatings that are currently known or that later become known, such as a titanium nitride coating (TiN), or an aluminum titanium nitride coating (AlTiN). Accordingly, this detailed description of embodiments is to be taken in an illustrative, as opposed to a limiting sense.

What is claimed is:

1. A reciprocating saw blade, comprising:
an elongated blade body defining an inner end and a distal end;
a tang located at the inner end of the blade body;
a cutting edge located on one side of the blade body and an opposing edge located on an opposite side of the blade body, the cutting edge and the opposing edge each extending from the inner end of the blade body to the distal end of the blade body, the cutting edge comprising:
a first cutting edge portion comprising a first substantially straight cutting edge extending from the inner end of the blade body to a second cutting edge portion;
the second cutting edge portion disposed adjacent the first cutting edge portion and comprising a concave curved cutting edge extending from the first cutting edge portion to a third cutting edge portion and curved in a concave direction toward the opposing edge of the blade body; and
the third cutting edge portion comprising a second substantially straight cutting edge extending from the second cutting edge portion to the distal end of the blade body.

2. The reciprocating saw blade of claim 1, wherein the opposing edge is a non-working edge of the blade body.

3. The reciprocating saw blade of claim 2, wherein the non-working edge extends from the tang towards the distal end.

4. The reciprocating saw blade of claim 1, wherein the tang comprises an elongated bottom edge projecting therefrom at an acute tang angle relative to a line tangent to an inner end of the cutting edge at the inner end of the blade body.

5. The reciprocating saw blade of claim 4, wherein the acute tang angle is at least about 3°.

6. The reciprocating saw blade of claim 4, wherein the acute tang angle is within a range of about 3° to about 8°.

7. The reciprocating saw blade of claim 4, wherein the acute tang angle orients the cutting edge such that an entirety of the cutting edge from the inner end of the blade body to the distal end is angled downwardly relative to the elongated bottom edge of the tang.

8. The reciprocating saw blade of claim 7, wherein the curved cutting edge of the second cutting edge portion increases the angle downwardly relative to the elongated bottom edge of the tang.

9. The reciprocating saw blade of claim 1, wherein the first cutting edge portion defines an innermost portion of the cutting edge.

10. The reciprocating saw blade of claim 1, wherein the third cutting edge portion extends to the distal end of the blade body.

11. The reciprocating saw blade of claim 1, wherein the second cutting edge portion curves in the concave direction a maximum distance toward or in the direction of the opposing edge of the blade body within a range of about 0.030 inches to about 0.200 inches.

12. A reciprocating saw blade as defined in claim 11, wherein the maximum distance corresponds to an approximately middle point of the second cutting edge portion.

13. A reciprocating saw blade, comprising:
an elongated blade body defining an inner end and a distal end;
a tang located at the inner end of the blade body;
a cutting edge located on one side of the blade body, the cutting edge comprising:
a first cutting edge portion comprising a first substantially non-curved cutting edge extending from the inner end to a second cutting edge portion;
the second cutting edge portion disposed adjacent the first cutting edge portion and comprising a concave curved cutting edge extending from the first cutting edge portion to the third cutting edge portion; and
the third cutting edge portion comprising a second substantially non-curved cutting edge extending from the second cutting edge portion to the distal end of the blade body.

14. The reciprocating saw blade of claim 13, wherein the tang comprises an elongated bottom edge projecting therefrom at an acute tang angle relative to a line tangent to an inner end of the cutting edge at the inner end of the blade body, wherein the acute tang angle is at least about 3°.

15. The reciprocating saw blade of claim 14, wherein the acute tang angle orients the cutting edge such that an entirety of the cutting edge from the inner end of the blade body to the distal end is angled downwardly relative to the elongated bottom edge of the tang.

16. The reciprocating saw blade of claim 13, wherein the first cutting edge portion defines an innermost portion of the cutting edge and wherein the third cutting edge portion extends to the distal end of the blade body.

17. The reciprocating saw blade of claim 13, wherein the first cutting edge portion extends to the inner end of the blade body.

18. The reciprocating saw blade of claim 13, wherein the concave curved cutting edge is curved toward or in a direction of an opposing edge of the blade body.

19. The reciprocating saw blade of claim 18, wherein the opposing edge is a non-working edge of the blade body, wherein the non-working edge extends from the tang towards the distal end.

20. A reciprocating saw blade, comprising:
an elongated blade body defining an inner end and a distal end;
a tang located at the inner end of the blade body;
a cutting edge located on one side of the blade body, extending from the inner end of the blade body to the distal end of the blade body, the cutting edge comprising:
a first cutting edge portion comprising a first substantially straight cutting edge extending from the inner end of the blade body to a second cutting edge portion;
the second cutting edge portion disposed adjacent the first cutting edge portion and comprising a concave curved cutting edge extending from the first cutting edge portion to a third cutting edge portion and curved toward a second edge opposite the cutting edge of the blade body; and
a third cutting edge portion comprising a second substantially straight cutting edge extending from the second cutting edge portion to the distal end of the blade body.

* * * * *